(12) United States Patent
Svensson et al.

(10) Patent No.: US 9,482,358 B2
(45) Date of Patent: Nov. 1, 2016

(54) SOLENOID VALVE

(71) Applicant: JOHNSON ELECTRIC S.A., Murten (CH)

(72) Inventors: Carl Henric Andreas Svensson, Shenzhen (CN); Thomas Roschke, Hong Kong (CN)

(73) Assignee: Johnson Electric S.A., Murten (CH)

( * ) Notice: Subject to any disclaimer, the term of this patent is extended or adjusted under 35 U.S.C. 154(b) by 23 days.

(21) Appl. No.: 14/522,279

(22) Filed: Oct. 23, 2014

(65) Prior Publication Data

US 2015/0108382 A1 Apr. 23, 2015

(30) Foreign Application Priority Data

Oct. 23, 2013 (CN) .......................... 2013 1 0505158

(51) Int. Cl.
| | |
|---|---|
| *F16K 31/02* | (2006.01) |
| *H01F 7/126* | (2006.01) |
| *H01F 7/16* | (2006.01) |
| *H01F 7/08* | (2006.01) |

(52) U.S. Cl.
CPC .............. *F16K 31/02* (2013.01); *H01F 7/126* (2013.01); *H01F 7/16* (2013.01); *H01F 7/1607* (2013.01); *H01F 2007/083* (2013.01)

(58) Field of Classification Search
CPC .......... F16K 31/02; H01F 7/126; H01F 7/16; H01F 7/1807; H01F 2007/083; Y10T 137/87217; Y10T 137/87241; Y10T 137/86622
USPC ........ 137/596.17, 596.2, 625.65; 251/129.15
See application file for complete search history.

(56) References Cited

U.S. PATENT DOCUMENTS

| | | | | |
|---|---|---|---|---|
| 3,324,889 A | * | 6/1967 | Batts ................... | F16K 31/0606 137/625.65 |
| 3,989,063 A | * | 11/1976 | Brouwers ............... | B60T 8/364 137/596.17 |
| 4,086,889 A | * | 5/1978 | Yagi ........................ | F02P 5/103 123/406.7 |
| 4,102,526 A | * | 7/1978 | Hargraves ........... | F16K 31/0606 137/625.65 |
| 4,322,057 A | * | 3/1982 | Yamanaka .......... | F16K 31/0606 137/625.65 |
| 4,416,305 A | * | 11/1983 | Commette .............. | F16K 11/22 137/556 |
| 4,431,218 A | * | 2/1984 | Paul, Jr. ................ | F16L 37/144 285/305 |
| 4,442,864 A | * | 4/1984 | Kosugi ............... | F16K 31/0606 137/625.27 |
| 4,582,294 A | | 4/1986 | Fargo | |
| 4,830,332 A | * | 5/1989 | Miura ................. | F16K 31/0655 251/129.07 |

(Continued)

FOREIGN PATENT DOCUMENTS

| | | |
|---|---|---|
| JP | 9242916 A | 9/1997 |
| JP | 2003232459 A | 8/2003 |

*Primary Examiner* — Craig Schneider
*Assistant Examiner* — Minh Le
(74) *Attorney, Agent, or Firm* — Muncy, Geissler, Olds & Lowe, P.C.

(57) ABSTRACT

A solenoid valve has a valve body with first and second ports. A bobbin is mounted to the valve body. A winding is wound on the bobbin. A stator is fitted to one end of a hole through the bobbin and defines a third port therein. A plunger is slidably fitted to the hole and movable between a normal position and an energized position. Two plugs are installed at respective ends of the plunger and arranged to selectively close the first and third ports. A flux return device is fixed to the stator and the bobbin. A spring returns the plunger from the energized position, where the plunger closes the third port and the first and second ports communicate with each other via the hole in the bobbin, to the normal position, where the plunger closes the first port and the second and third ports communicate with each.

18 Claims, 5 Drawing Sheets

(56) References Cited

U.S. PATENT DOCUMENTS

| | | | | |
|---|---|---|---|---|
| 4,930,747 A * | 6/1990 | Nakamura | F16K 31/0655 | 251/129.15 |
| 5,207,245 A * | 5/1993 | Maranzano | F16K 31/0606 | 137/625.65 |
| 5,232,196 A * | 8/1993 | Hutchings | F16K 31/0655 | 251/129.08 |
| 5,246,199 A * | 9/1993 | Numoto | F16K 31/0658 | 251/129.15 |
| 5,720,469 A * | 2/1998 | Miyazato | B60T 8/363 | 251/129.15 |
| 5,927,334 A * | 7/1999 | Ishigaki | F16K 11/044 | 137/596.17 |
| 5,992,461 A | 11/1999 | Gilmore et al. | | |
| 6,286,768 B1 * | 9/2001 | Vetters | F02M 57/021 | 239/533.2 |
| 6,777,840 B2 * | 8/2004 | Giacomini | F16K 31/047 | 137/596.17 |
| 7,871,060 B2 * | 1/2011 | Armour | F16K 31/0675 | 251/129.15 |
| 7,938,383 B2 * | 5/2011 | Zur | H01F 7/126 | 251/129.15 |
| 8,061,685 B2 * | 11/2011 | Ueda | F16K 31/0658 | 251/129.15 |
| 8,186,647 B2 * | 5/2012 | Chen | F16K 31/0662 | 251/129.15 |
| 8,648,680 B2 * | 2/2014 | Adler | F16K 31/0675 | 335/260 |
| 2005/0253103 A1 * | 11/2005 | Bente | F16K 31/0655 | 251/129.15 |
| 2007/0164243 A1 | 7/2007 | Volz | | |
| 2008/0272208 A1 * | 11/2008 | Anderson | B65D 83/262 | 239/302 |
| 2009/0256093 A1 * | 10/2009 | Chen | F16K 31/0675 | 251/129.15 |
| 2010/0320407 A1 * | 12/2010 | Beneker | F16K 11/048 | 251/129.15 |
| 2011/0089350 A1 * | 4/2011 | Beneker | F01L 1/34 | 251/129.15 |
| 2014/0020379 A1 * | 1/2014 | Steinman | F02D 23/00 | 60/602 |

* cited by examiner

SOLENOID VALVE

CROSS REFERENCE TO RELATED APPLICATIONS

This non-provisional patent application claims priority under 35 U.S.C. §119(a) from Patent Application No. 201310505158.X filed in The People's Republic of China on Oct. 23, 2013, the entire contents of which are hereby incorporated by reference.

FIELD OF THE INVENTION

This invention relates to a solenoid valve, and more particularly related to a solenoid valve which can generate an increased solenoid force.

BACKGROUND OF THE INVENTION

Solenoid valves are commonly used in medical apparatus such as massage devices for patients. U.S. Pat. No. 5,992,461 discloses a typical solenoid valve which comprises a valve body with two ports and a solenoid. The solenoid comprises a flux return frame, a bobbin with an inner hole, a stator installed in one end of the hole of the bobbin and forming another port, a winding wound on the bobbin, and a plunger installed in the other end of the hole of the bobbin. The plunger defines an inner space within which a pair of plugs and an internal spring are installed. The internal spring is compressed between the plugs for holding the plugs in position. An external spring is arranged between the plunger and the stator. The frame has two ends, one fixed to the stator and the other fixed to the valve body. In the energized state, the plunger is attracted to the stator and one of the plugs inside the plunger closes the port of the stator and the two ports of the valve body are in communication with each other. In the normal state, i.e. when the solenoid is deenergised, the plunger is pushed away from the stator by the external spring and the other plug inside the plunger closes the first port of the valve body. A channel is formed between an outer surface of the plunger and an inner surface of the valve body for communicating the port of the stator with the second port of the valve body in the normal state. A big gap is therefore formed between the outer surface of the plunger and the edge of the end of the frame. The big gap has a large magnetic resistance, and reduces the attraction force generated between the stator and the plunger when the solenoid is energized. In order to meet the required attraction force, the winding needs high power consuming a relatively large amount of electrical power and generating heat that needs to be dissipated.

Hence, there a desire for an improved solenoid valve which can generate sufficient attraction force with less power.

SUMMARY OF THE INVENTION

Accordingly, in one aspect thereof, the present invention provides a solenoid valve comprising: a valve body defining a first port and a second port isolated from the first port; a bobbin mounted to the valve body, the bobbin comprising: a tube portion; a connection portion formed at one end of the tube portion; a mounting portion extending from the connection portion in a direction away from the tube portion and mounted to the valve body; and a hole axially extending through the tube portion, connection portion and mounting portion; a winding wound on the tube portion of the bobbin; a stator installed in one end of the hole in the bobbin remote from the mounting portion, the stator defining a third port therein; a plunger defining a void therein; first and second plugs mounted at respective axial ends of the plunger; a flux return device fixed to the stator and the bobbin and configured for cooperating with the plunger and the stator to provide a path for magnetic flux generated by the winding; and a spring attached to the plunger and arranged to urge the plunger towards the valve body, wherein the plunger is slidably disposed within the hole in the bobbin and movable between a normal position, where the plunger is adjacent the valve body and the first plug closes the first port and the second port communicates with the third port via a passage, and an energized position where the plunger is adjacent the stator and the second plug closes the third port and the second port communicates with the first port via the hole in the bobbin; wherein, when energized, the winding moves the plunger against the urgings of the spring to the energized position; and wherein the passage between the second port and the third port passes through the void of the plunger.

Preferably, the plunger comprises a body portion within which the void is formed, the body portion comprises a middle section and a pair of end sections extending from respective ends of the middle section, a channel being formed between an inner surface of the bobbin and an outer surface of each of the end sections of the body portion, an opening being formed at a joint between the middle section and each of the end sections for communicating the void with a corresponding channel, the passage passing through the channels and the openings.

Preferably, each of the end sections has an outer diameter less than that of the middle section.

Preferably, the plunger further comprises a cap fixedly mounted around one of the end sections and the cap defines a through hole providing access to one of said plugs.

Preferably, the flux return device comprises: a U-shaped frame with a closed end and an open end, the stator being fixed to the closed end of the frame; and a flux plate having an outer side and an inner side, the outer side of the flux plate being fixed to the open end of the frame, the inner side of the flux plate being fixed to the connection portion of the bobbin by way of insert molding.

Preferably, the flux plate defines a through hole through which the hole in the bobbin and material of the bobbin surrounding the hole extends, the through hole in the flux plate has an inner surface, the plunger having an outer surface facing the inner surface of the through hole, a distance between the outer surface of the plunger and the inner surface of the through hole of the flux plate being less than 1 mm.

Preferably, the flux plate defines a plurality of through apertures through which material of the bobbin extends forming connection pins inter-connecting two parts of the connection portion of the bobbin located on opposite sides of the flux plate.

Preferably, the bobbin is pivotably mounted to the valve body.

Preferably, one of the mounting portion of the bobbin and the valve body defines an annular groove and the other of the mounting portion of the bobbin and the valve body defines a locking hole, a locking pin extends through the locking hole and is received in the annular groove.

Preferably, a seal is provided between the mounting portion of the bobbin and the valve body, and another seal is provided between the bobbin and the stator.

Preferably, at least one of the plugs is spring loaded by a second spring disposed within the void in the plunger to limit the contact force between said plug and the corresponding port.

According to another aspect thereof, the present invention provides a solenoid valve comprising: a valve body defining a first port and a second port isolated from the first port; a bobbin mounted to the valve body, the bobbin comprising: a tube portion; a connection portion formed at one end of the tube portion; a mounting portion extending from the connection portion in a direction away from the tube portion and mounted to the valve body; and a hole axially extending through the tube portion, connection portion and mounting portion; a winding wound on the tube portion of the bobbin; a stator installed in one end of the hole in the bobbin remote from the mounting portion, the stator defining a third port therein; a plunger; first and second plugs mounted at respective axial ends of the plunger; a flux return device fixed to the stator and the bobbin and configured for cooperating with the plunger and the stator to provide a path for magnetic flux generated by the winding; and a spring attached to the plunger and arranged to urge the plunger towards the valve body, wherein the plunger is slidably disposed within the hole in the bobbin and movable between a normal position, where the plunger is adjacent the valve body and the first plug closes the first port and the second port communicates with the third port via a passage, and an energized position where the plunger is adjacent the stator and the second plug closes the third port and the second port communicates with the first port via the hole in the bobbin; wherein, when energized, the winding moves the plunger against the urgings of the spring to the energized position; and wherein the flux return device comprises a frame and a flux plate fixed to the frame, the stator is fixed to the frame, and the flux plate is fixed to the connection portion of the bobbin by insert molding; and wherein the flux plate defines a through hole through which the hole of the bobbin passes unbroken, the through hole has an inner surface, the plunger has an outer surface facing the through hole, and a distance between the outer surface of the plunger and the inner surface of the through hole of the flux plate is less than 1 mm.

Preferably, the plunger comprises a body portion within which a void is formed, the body portion comprises a middle section and a pair of end sections extending from respective ends of the middle section, a channel being formed between an inner surface of the bobbin and an outer surface of each of the end sections, an opening being formed at a joint between the middle section and each of the end sections for communicating the void with a corresponding channel, the passage passing through the channels.

Preferably, each of the end sections has an outer diameter less than that of the middle section.

Preferably, the plunger further comprises a cap fixedly mounted around one of the end sections of the body portion adjacent the valve body, and the cap defines a through hole providing access to one of said plugs.

According to a further aspect thereof, the present invention provides a solenoid valve comprising: a valve body defining a first port and a second port isolated from the first port; a bobbin pivotably mounted to the valve body, the bobbin comprising: a tube portion; a connection portion formed at one end of the tube portion; a mounting portion extending from the connection portion in a direction away from the tube portion and mounted to the valve body; and a hole axially extending through the tube portion, connection portion and mounting portion; a winding wound on the tube portion of the bobbin; a stator installed in one end of the hole in the bobbin remote from the mounting portion, the stator defining a third port therein; a plunger; first and second plugs mounted at respective axial ends of the plunger; a flux return device fixed to the stator and the bobbin and configured for cooperating with the plunger and the stator to provide a path for magnetic flux generated by the winding; and a spring attached to the plunger and arranged to urge the plunger towards the valve body, wherein the plunger is slidably disposed within the hole in the bobbin and movable between a normal position, where the plunger is adjacent the valve body and the first plug closes the first port and the second port communicates with the third port via a passage, and an energized position where the plunger is adjacent the stator and the second plug closes the third port and the second port communicates with the first port via the hole in the bobbin; and wherein, when energized, the winding moves the plunger against the urgings of the spring to the energized position.

Preferably, one of the bobbin and valve body defines an annular groove and the other of the bobbin and valve body defines a mounting hole, at least one locking pin extending through the mounting hole to be received in the groove.

Preferably, the plunger comprises a body portion within which the void is formed, the body portion comprises a middle section and a pair of opposite end sections respectively extending from opposite ends of the middle section, a channel being formed between an inner surface of the bobbin and an outer surface of each of the opposite end sections of the body portion, an opening being formed at a joint between the body portion and each of the opposite ends for communicating the void with a corresponding channel, the passage passing through the channels.

Preferably, the flux return device comprises a frame with an open end and a plate fixed to the open end of the frame, the stator is fixed to the frame, and the plate is fixed to the connection portion of the bobbin by insert molding; and wherein the plate defines a through hole through which the hole in the bobbin passes unbroken, the plate has an inner surface surrounding the through hole, the plunger has an outer surface facing the bobbin, and a distance between the outer surface of the plunger and the inner surface of the plate is less than 0.85 mm.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF VARIOUS EMBODIMENTS

Referring to the Figures, a solenoid valve 10 according to a preferred embodiment of the present invention comprises a valve body 20, a bobbin 30, a winding 40, a stator 50, a plunger 60 and a flux return device 70.

Valve body 20 is preferably made of a plastics material and comprises a plurality of ports. In this embodiment, valve body 20 has a first port 22 and a second port 24. Within valve body 20, first port 22 is isolated from second port 24. A cover 21 closes one end of an axial passage through the valve body which forms part of first port 22. The use of cover 21 simplifies molding of the valve body. Two bolt holes 28 extend through valve body 20 to aid mounting of the valve body to an apparatus.

Bobbin 30 is fixed to valve body 20, and is made of electrically insulation material. Bobbin 30 comprises a tube portion 32, a connection portion 34 formed at one end of tube portion away from the stator 50 and a mounting portion 36 extending axially from connection portion 34. Mounting portion 36 is further away from the stator 50 than connection portion 34. Bobbin 30 has a central hole 37. In this embodiment, hole 37 extends through tube portion 32, connection portion 34 and mounting portion 36 and has a uniform dimension along the entire length.

Winding 40 is wound on the outer surface of tube portion 32 of bobbin 30, within the area bounded by flanges 37.

Stator 50, made of magnetically conductive material such as ferromagnetic material or soft magnetic material, is installed in one end of hole 37 of bobbin 30. A third port 52 is formed in stator 50 and preferably extends through stator 50 in an axial direction thereof.

Figure 4:
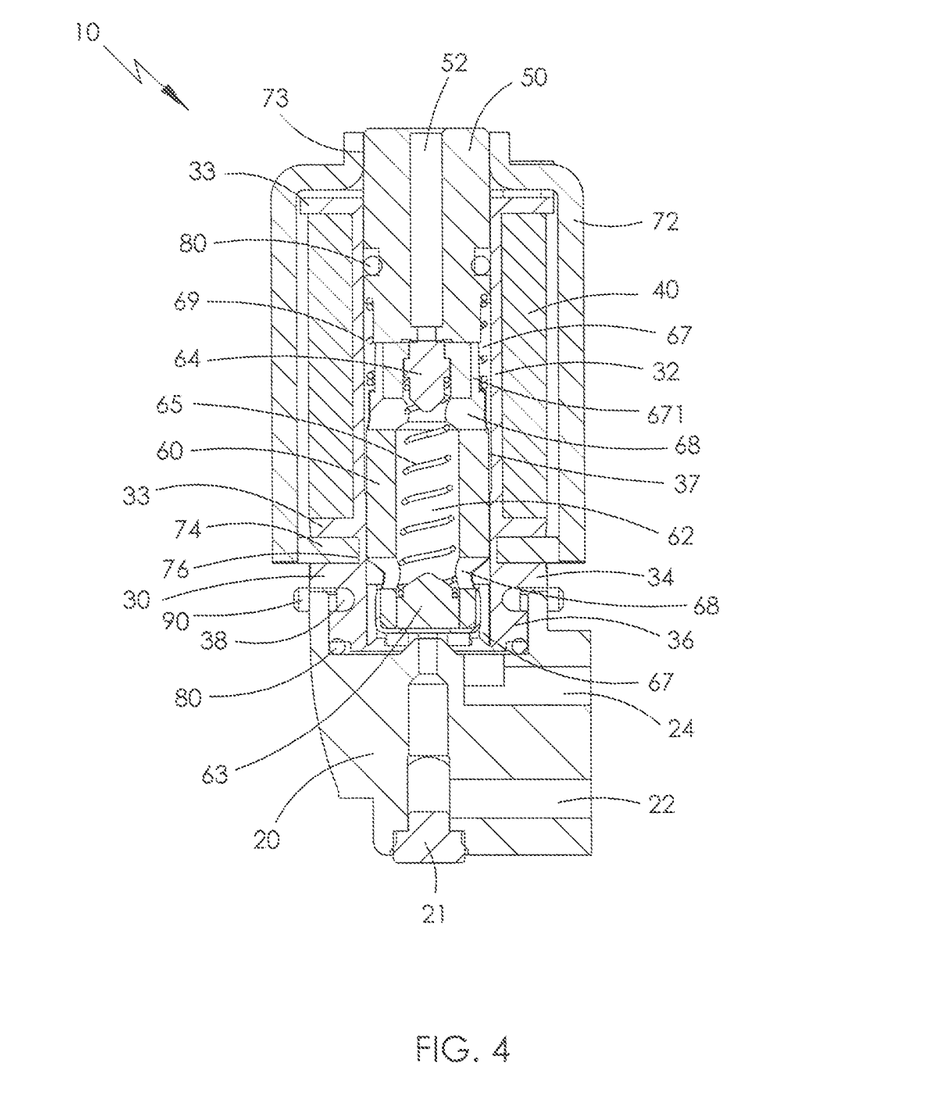
FIG. 4 is a sectional view of the solenoid valve of FIG. 1.
Figure 5:
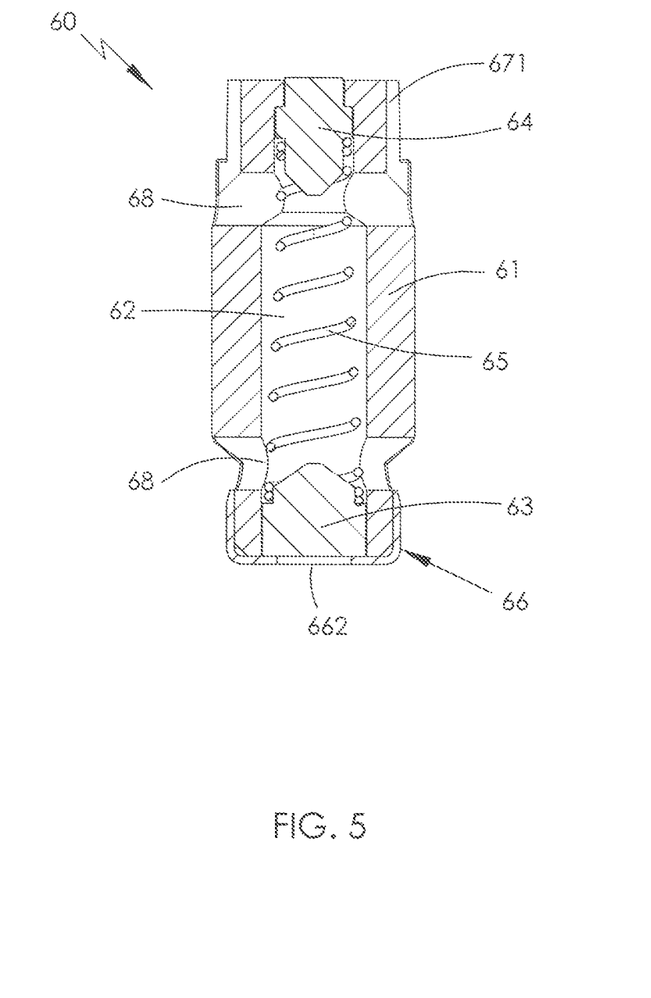
FIG. 5 is a sectional view of a plunger of the solenoid valve of FIG. 1.

Plunger 60, made of magnetically conductive material such as ferromagnetic material or soft magnetic material, is installed in the other end of hole 37 of bobbin 30 and is moveable in hole 37 relative to stator 50. Referring to FIG. 5, plunger 60 comprises a body portion 61 which defines a void 62 therein, in the form of an axial through hole. Plugs 63, 64, preferably of rubber, are installed in respective ends of void 62. A first resilient member such as a coil spring 65 is installed in void 62 and compressed between plugs 63, 64 for urging plug 64 protruding out of void 62 and beyond the corresponding end surface of body portion 61 to allow plug 64 to seal the third port 52 when solenoid 10 is in the energized state. The ends of spring 65 are respectively attached to plugs 63, 64. A cap 66 is attached to and surrounds the bottom end of plunger 60 adjacent valve body 20 to secure plug 63 therein. Cap 66 has a through opening 662 to provide access for valve body 20 to contact plug 63. The end sections of body portion 61 have a reduced diameter compared to the middle section of body portion 61. Thus, a channel 67 (see FIG. 4) is formed between the inner surface of bobbin 30 and the outer surface of each of the end sections. The upper end section of the plunger has vertical grooves 671 formed therein to increase the volume of the upper channel 27. The grooves compensate for the presence of second spring 69 in channel 27. A radial opening 68, formed at a joint between the middle section and each end section, communicates void 62 with a corresponding channel 67. A second resiliently deformable member such as a spring 69 is compressed between stator 50 and the other end of plunger 60 for pushing plunger 60 away from stator 50 when solenoid 10 is de-energized. Ends of spring 69 are attached to stator 50 and plunger 60, respectively.

Figure 6:
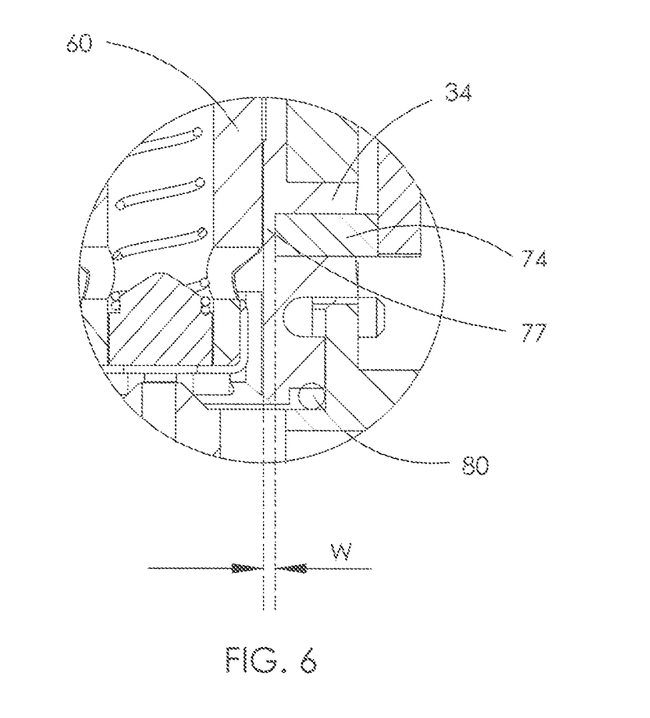
FIG. 6 is an enlarged view of a portion of FIG. 4.
Figure 7:
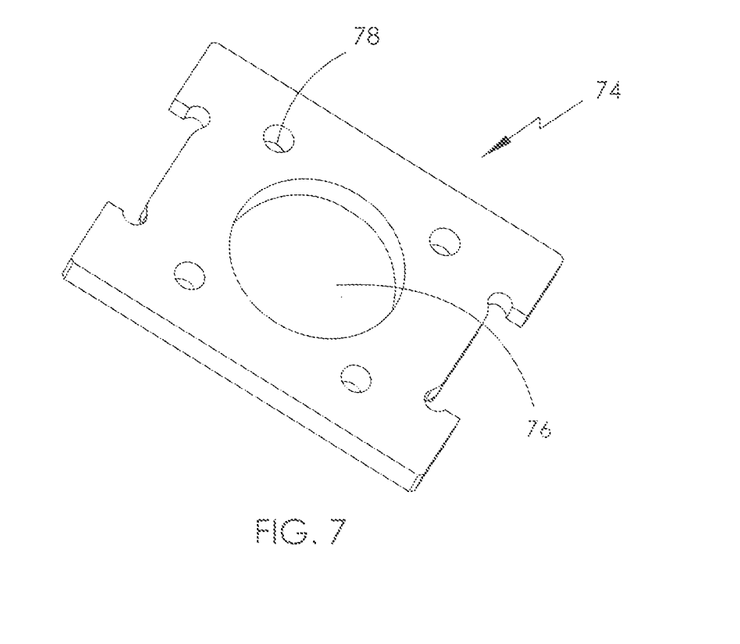
FIG. 7 illustrates a flux return plate of the solenoid valve of FIG. 1.

Flux return device 70 cooperates with stator 50 and plunger 60 to provide a path for magnetic flux generated by winding 40. In this embodiment, flux return device 70 comprises a U-shaped frame 72 with an open end and a closed end, and a flux plate 74 fixed to the open end of frame 72. Frame 72 and plate 74 are made of magnetically conductive material, preferably metal such as mild steel. Flux plate 74 has a central through hole 76 and a plurality of through apertures 78 (see FIG. 7) around central hole 76. Flux plate 74 is preferably fixed to connection portion 34 of bobbin 30 by way of insert molding. During molding of bobbin 30, plate 74 is embedded in connection portion 34 of bobbin 30 and material of bobbin 30 extends through central hole 76 to form connection wall 77 (see FIG. 6) which connects two parts of connection portion 34 of bobbin 30 located at opposite sides of plate 74. Through apertures 78 of plate 74 are filled with material which form connection pins connecting the two parts of connection portion 34 together. The connection pins reinforce the mechanical strength of bobbin 30, especially when connection wall 77 is thin.

The inner edge of central hole 76 of flux plate 74 is separated from the through hole 37 of the bobbin by the thickness of connection wall 77 and thus is close to the outer surface of plunger 60. Preferably, the thickness of connection wall 77 of bobbin 30 is less than 1 mm. Thus, as the plunger makes sliding contact with the through hole of bobbin 30, a small distance W exists between the outer surface of plunger 60 and flux plate 74. That is, gap in the flux path between plunger 60 and flux plate 74 is small. Preferably, distance W is less than 1 mm. More preferably, distance W is less than 0.85 mm. In this embodiment, distance W is about 0.5 mm. Compared to the traditional solenoid valve shown in U.S. Pat. No. 5,992,461, the solenoid valve of the present invention has an increased solenoid force or force of attraction, as no channel for fluid is formed between the inner edge of flux plate 74 and the outer surface of plunger 60 and the gap in the flux path between flux plate 74 and plunger 60 is therefore greatly reduced. Outer edges of flux plate 74 may be fixed to the open end of frame 72 via welding, soldering, crimping or detachably connected by means such as interlocking means or press fit. In this embodiment, frame 72 is integrally formed as a single unit. Alternatively, frame 72 may be made of two L-shaped halves fixed together.

Preferably, the closed end of frame 72 has an opening 73. Preferably, stator 50 has a cylindrical configuration. One end of stator 50 may be fixed in opening 73 of frame 72 via conventional means such as welding, soldering, press fit, etc.

Figure 1:
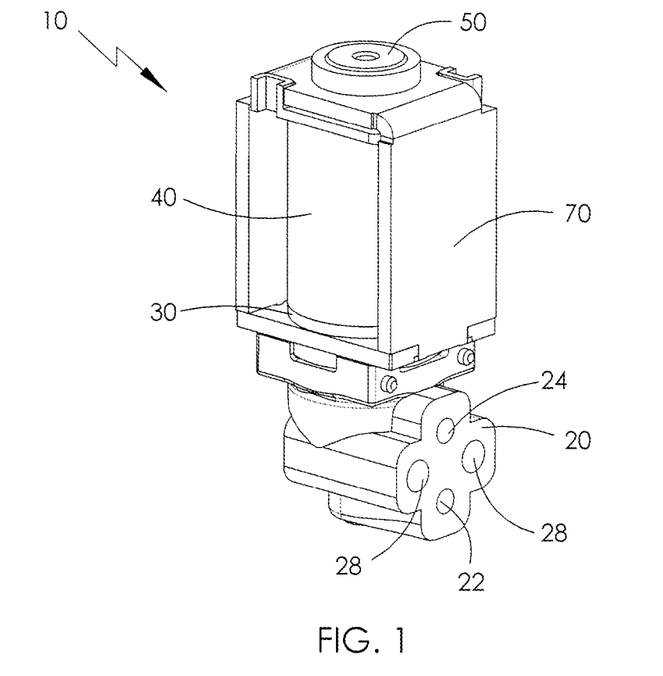
FIG. 1 illustrates a solenoid valve having a solenoid assembly and a valve body, according to a preferred embodiment of the present invention.
Figure 2:
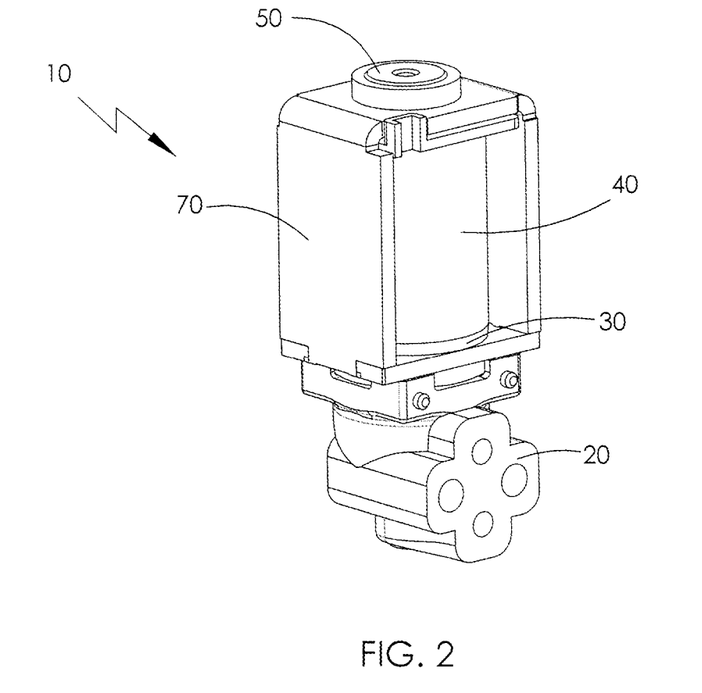
FIG. 2 illustrates the solenoid valve of FIG. 1 with the solenoid assembly rotated with respect to the valve body.
Figure 3:
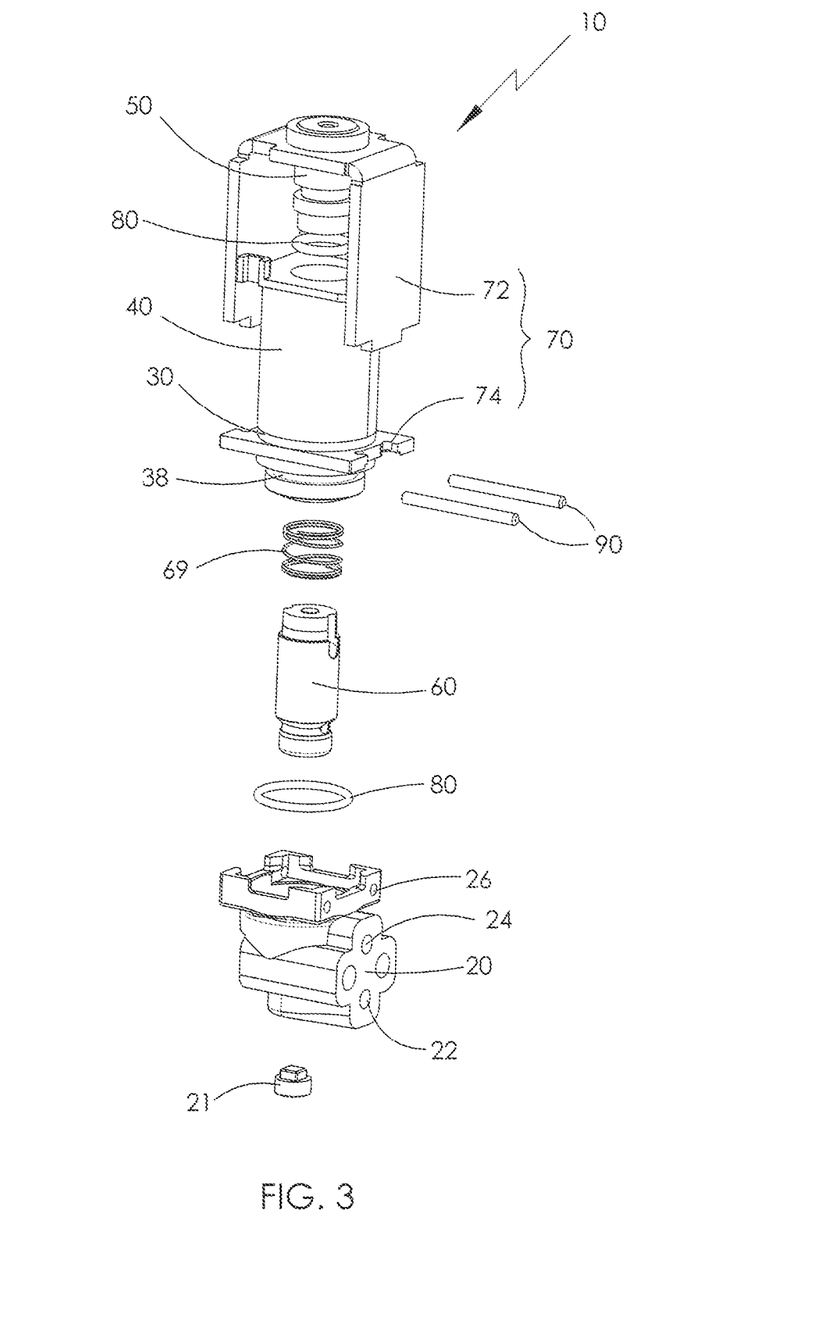
FIG. 3 is an exploded view of the solenoid valve of FIG. 1.

Sealing structures such as rubber O-rings 80 are installed between bobbin 30 and valve body 20, and between bobbin 30 and stator 50. Two locking pins 90 are used to attach valve body 20 to bobbin 30. Preferably, mounting portion 36 of bobbin 30 defines an annular groove 38. Valve body 20 defines a pair of locking holes 26. Locking pins 90 extend through respective locking holes 26 to be received in groove 38 of bobbin 30 to thereby pivotably attach valve body to bobbin 30. That is, the solenoid assembly is pivotable relative to valve body 20. Thus, the solenoid valve of this embodiment is suitable for a variety of applications which require different orientation of ports. FIG. 2 illustrates the solenoid valve of FIG. 1 with the solenoid assembly of bobbin 30, winding 40, stator 50 and plunger 60 in a different orientation relative to valve body 20. In FIG. 2 the solenoid assembly is rotated by 90° relative to the valve body. This attachment mechanism allows the solenoid assembly or valve assembly to be replaced if desired and allows a single solenoid assembly type to be used with a variety of valve body types to simplify assembly and production costs.

In operation, when winding 40 is electrified, plunger 60 is attracted to stator 50 and moves toward stator 50 until the end surface of plunger 60 contacts with the end surface of stator 50. At the energized position, plug 64 of plunger 60 seals the third port 52 of stator 50. Plug 63 is spaced from port 22. Ports 22 and 24 of valve body 20 are connected with each other via a part of hole 37 of bobbin 30 below plunger 60. Fluid can pass between port 22 and port 24. When the coil is deenergised, the magnetic attraction between stator 50 and plunger 60 disappears and plunger 60 is returned back to the original position (also known as the normal position) by the second spring 69. In the normal position, plunger 60 is spaced from stator 50 and the third port 52 is open while first port 22 is closed by plug 63. The second port 24 is connected to the third port 52 via a passage which comprises channels 67, openings 68, void 62. Fluid such as air can pass between port 24 and port 52.

Solenoid valves of the present invention may be used in medical apparatus such as vascular thrombosis treatment devices. Alternatively, solenoid valves of the present invention may also be used in other applications, such as pneumatic or hydraulic systems for controlling piston movement, nebulizer systems, controls for lumbar or lower back support of car seats and so on.

The embodiments described above are provided by way of examples only, and various other modifications will be apparent to persons skilled in the field without departing from the scope of the invention as defined by the appended claims.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

In the description and claims of the present application, each of the verbs "comprise", "include", "contain" and "have", and variations thereof, are used in an inclusive sense, to specify the presence of the stated item or feature but do not preclude the presence of additional items or features.

The invention claimed is:

1. A solenoid valve comprising:
a valve body defining a first port and a second port isolated from the first port;
a bobbin mounted to the valve body, the bobbin comprising:
a tube portion;
a connection portion formed at one end of the tube portion;
a mounting portion extending from the connection portion in a direction away from the tube portion and mounted to the valve body; and
a hole axially extending through the tube portion, connection portion and mounting portion;
a winding wound on the tube portion of the bobbin;
a stator installed in one end of the hole in the bobbin remote from the mounting portion, the stator defining a third port therein;
a plunger installed in the hole of the bobbin, the plunger having an outer circumferential surface and defining a void therein, the void being spaced from the outer circumferential surface;
first and second plugs mounted at respective axial ends of the plunger;
a flux return device fixed to the stator and the bobbin and configured for cooperating with the plunger and the stator to provide a path for magnetic flux generated by the winding; and
a spring attached to the plunger and arranged to urge the plunger towards the valve body,
wherein the plunger is slidably disposed within the hole in the bobbin and movable between a normal position, where the plunger is adjacent the valve body and the first plug closes the first port and the second port communicates with the third port via a passage, and an energized position where the plunger is adjacent the stator and the second plug closes the third port and the second port communicates with the first port via the hole in the bobbin;
wherein, when energized, the winding moves the plunger against the urgings of the spring to the energized position;
wherein the passage between the second port and the third port passes through the void of the plunger; and
wherein the plunger comprises a body portion within which the void is formed, the body portion comprises a middle section and a air of end sections extending from respective ends of the middle section, a channel being formed between an inner surface of the bobbin and an outer surface of each of the end sections of the body portion, an opening being formed at a joint between the middle section and each of the end sections for communicating the void with a corresponding channel, the passage passing through the channels and the openings.

2. The solenoid valve of claim 1, wherein each of the end sections has an outer diameter less than that of the middle section.

3. The solenoid valve of claim 1, wherein the plunger further comprises a cap fixedly mounted around one of the end sections and the cap defines a through hole providing access to one of said plugs.

4. The solenoid valve of claim 1, wherein the bobbin is pivotably mounted to the valve body.

5. The solenoid valve of claim 4, wherein one of the mounting portion of the bobbin and the valve body defines an annular groove and the other of the mounting portion of the bobbin and the valve body defines a locking hole, a locking pin extends through the locking hole and is received in the annular groove.

6. The solenoid valve of claim 1, wherein a seal is provided between the mounting portion of the bobbin and the valve body, and another seal is provided between the bobbin and the stator.

7. The solenoid valve of claim 1, wherein at least one of the plugs is spring loaded by a second spring disposed within the void in the plunger to limit the contact force between said plug and the corresponding port.

8. A solenoid valve comprising:
a valve body defining a first port and a second port isolated from the first port;

a bobbin mounted to the valve body, the bobbin comprising:
a tube portion;
a connection portion formed at one end of the tube portion;
a mounting portion extending from the connection portion in a direction away from the tube portion and mounted to the valve body; and
a hole axially extending through the tube portion, connection portion and mounting portion;
a winding wound on the tube portion of the bobbin;
a stator installed in one end of the hole in the bobbin remote from the mounting portion, the stator defining a third port therein;
a plunger defining a void therein;
first and second plugs mounted at respective axial ends of the plunger;
a flux return device fixed to the stator and the bobbin and configured for cooperating with the plunger and the stator to provide a path for magnetic flux generated by the winding; and
a spring attached to the plunger and arranged to urge the plunger towards the valve body,
wherein the plunger is slidably disposed within the hole in the bobbin and movable between a normal position, where the plunger is adjacent the valve body and the first plug closes the first port and the second port communicates with the third port via a passage, and an energized position where the plunger is adjacent the stator and the second plug closes the third port and the second port communicates with the first port via the hole in the bobbin;
wherein, when energized, the winding moves the plunger against the urgings of the spring to the energized position;
and wherein the passage between the second port and the third port passes through the void of the plunger;
wherein the flux return device comprises:
a U-shaped frame with a closed end and an open end, the stator being fixed to the closed end of the frame; and
a flux plate having an outer side and an inner side, the outer side of the flux plate being fixed to the open end of the frame, the inner side of the flux plate being fixed to the connection portion of the bobbin by way of insert molding.

9. The solenoid valve of claim 8, wherein the flux plate defines a through hole through which the hole in the bobbin and material of the bobbin surrounding the hole extends, the through hole in the flux plate has an inner surface, the plunger having an outer surface facing the inner surface of the through hole, a distance between the outer surface of the plunger and the inner surface of the through hole of the flux plate being less than 1 mm.

10. The solenoid valve of claim 8, wherein the flux plate defines a plurality of through apertures through which material of the bobbin extends forming connection pins inter-connecting two parts of the connection portion of the bobbin located on opposite sides of the flux plate.

11. A solenoid valve comprising:
a valve body defining a first port and a second port isolated from the first port;
a bobbin mounted to the valve body, the bobbin comprising:
a tube portion;
a connection portion formed at one end of the tube portion;
a mounting portion extending from the connection portion in a direction away from the tube portion and mounted to the valve body; and
a hole axially extending through the tube portion, connection portion and mounting portion;
a winding wound on the tube portion of the bobbin;
a stator installed in one end of the hole in the bobbin remote from the mounting portion, the stator defining a third port therein;
a plunger;
first and second plugs mounted at respective axial ends of the plunger;
a flux return device fixed to the stator and the bobbin and configured for cooperating with the plunger and the stator to provide a path for magnetic flux generated by the winding; and
a spring attached to the plunger and arranged to urge the plunger towards the valve body,
wherein the plunger is slidably disposed within the hole in the bobbin and movable between a normal position, where the plunger is adjacent the valve body and the first plug closes the first port and the second port communicates with the third port via a passage, and an energized position where the plunger is adjacent the stator and the second plug closes the third port and the second port communicates with the first port via the hole in the bobbin;
wherein, when energized, the winding moves the plunger against the urgings of the spring to the energized position; and
wherein the flux return device comprises a frame and a flux plate fixed to the frame, the stator is fixed to the frame, and the flux plate is fixed to the connection portion of the bobbin by insert molding; and
wherein the flux plate defines a through hole through which the hole of the bobbin passes unbroken, the through hole has an inner surface, the plunger has an outer surface facing the through hole, and a distance between the outer surface of the plunger and the inner surface of the through hole of the flux plate is less than 1 mm.

12. The solenoid valve of claim 11, wherein the plunger comprises a body portion within which a void is formed, the body portion comprises a middle section and a pair of end sections extending from respective ends of the middle section, a channel being formed between an inner surface of the bobbin and an outer surface of each of the end sections, an opening being formed at a joint between the middle section and each of the end sections for communicating the void with a corresponding channel, the passage passing through the channels.

13. The solenoid valve of claim 12, wherein each of the end sections has an outer diameter less than that of the middle section.

14. The solenoid valve of claim 12, wherein the plunger further comprises a cap fixedly mounted around one of the end sections of the body portion adjacent the valve body, and the cap defines a through hole providing access to one of said plugs.

15. A solenoid valve comprising:
a valve body defining a first port and a second port isolated from the first port;
a bobbin pivotably mounted to the valve body, the bobbin comprising:
a tube portion;
a connection portion formed at one end of the tube portion;

a mounting portion extending from the connection portion in a direction away from the tube portion and mounted to the valve body; and a hole axially extending through the tube portion, connection portion and mounting portion;

a winding wound on the tube portion of the bobbin;

a stator installed in one end of the hole in the bobbin remote from the mounting portion, the stator defining a third port therein;

a plunger;

first and second plugs mounted at respective axial ends of the plunger;

a flux return device fixed to the stator and the bobbin and configured for cooperating with the plunger and the stator to provide a path for magnetic flux generated by the winding; and a spring attached to the plunger and arranged to urge the plunger towards the valve body, wherein the plunger is slidably disposed within the hole in the bobbin and movable between a normal position, where the plunger is adjacent the valve body and the first plug closes the first port and the second port communicates with the third port via a passage, and an energized position where the plunger is adjacent the stator and the second plug closes the third port and the second port communicates with the first port via the hole in the bobbin; and wherein, when energized, the winding moves the plunger against the urgings of the spring to the energized position, wherein the flux return device comprises a frame with an open end and a plate fixed to the open end of the frame, the stator is fixed to the frame; and wherein the plate defines a through hole through which the bobbin passes, the plate has an inner surface surrounding the through hole, the plunger has an outer surface facing the bobbin, and a distance between the outer surface of the plunger and the inner surface of the plate is less than 0.85 mm.

16. The solenoid valve of claim 15, wherein one of the bobbin and valve body defines an annular groove and the other of the bobbin and valve body defines a mounting hole, at least one locking pin extending through the mounting hole to be received in the groove.

17. The solenoid valve of claim 15, wherein the plunger comprises a body portion within which the void is formed, the body portion comprises a middle section and a pair of opposite end sections respectively extending from opposite ends of the middle section, a channel being formed between an inner surface of the bobbin and an outer surface of each of the opposite end sections of the body portion, an opening being formed at a joint between the body portion and each of the opposite ends for communicating the void with a corresponding channel, the passage passing through the channels.

18. The solenoid valve of claim 15, wherein the plate is fixed to the connection portion of the bobbin by insert molding.

* * * * *